J. C. NEUSCHWANDER.
SUPPORT FOR MOTORS AND RECEPTACLES.
APPLICATION FILED JULY 16, 1909.
949,197.
Patented Feb. 15, 1910.
2 SHEETS—SHEET 1.
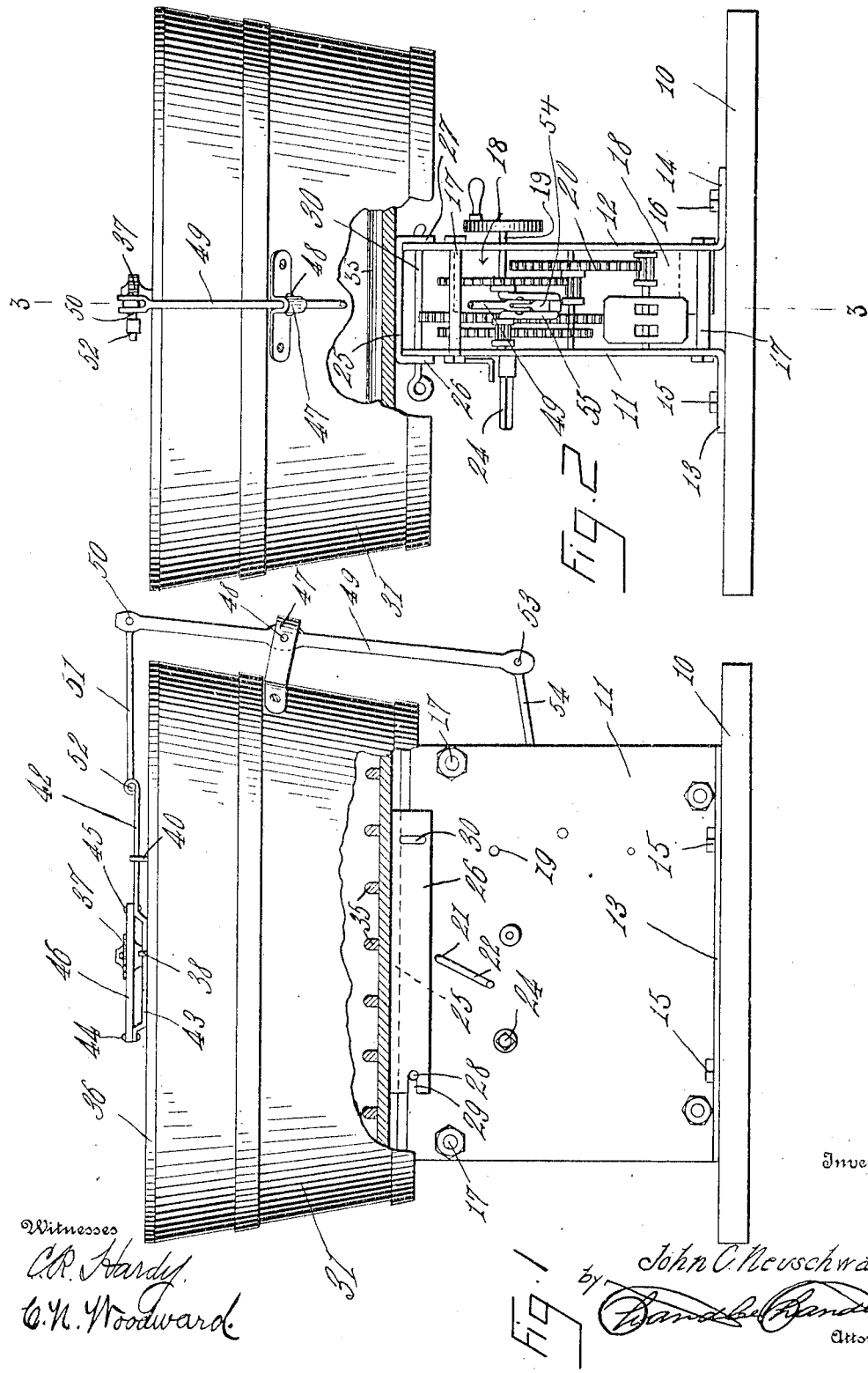

J. C. NEUSCHWANDER.
SUPPORT FOR MOTORS AND RECEPTACLES.
APPLICATION FILED JULY 16, 1909.
949,197.
Patented Feb. 15, 1910.
2 SHEETS—SHEET 2.
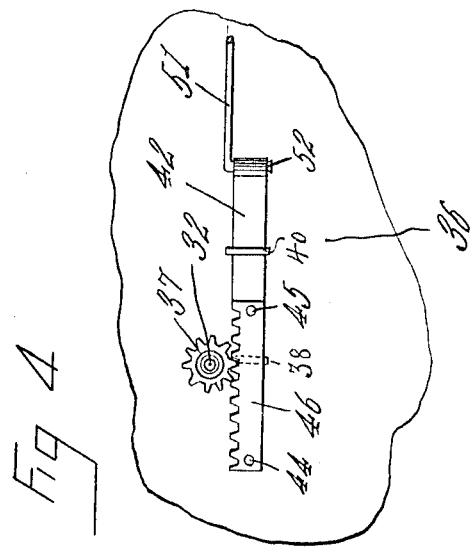
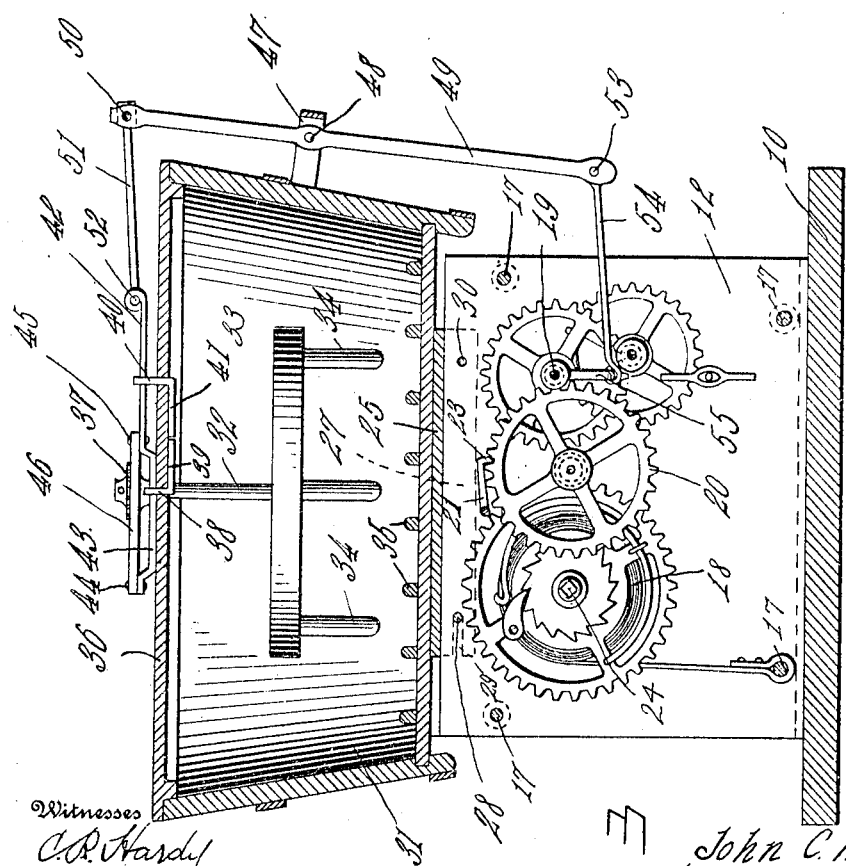
Witnesses
C. P. Hardy
C. H. Woodward
Inventor
John C. Neuschwander
by
Chandlee Chandlee
Attorneys

UNITED STATES PATENT OFFICE.

JOHN C. NEUSCHWANDER, OF DAKOTA, ILLINOIS.

SUPPORT FOR MOTORS AND RECEPTACLES.

949,197. Specification of Letters Patent. Patented Feb. 15, 1910.

Application filed July 16, 1909. Serial No. 508,024.

*To all whom it may concern:*

Be it known that I, JOHN C. NEUSCHWANDER, a citizen of the United States, residing at Dakota, in the county of Stephenson, State of Illinois, have invented certain new and useful Improvements in Supports for Motors and Receptacles; and I do hereby declare the following to be a full, clear, and exact description of the invention, such as will enable others skilled in the art to which it appertains to make and use the same.

This invention relates to combined motor and receptacle supports, and has for one of its objects to provide a simply constructed motor frame which is utilized not only for supporting the motor mechanism, but likewise for supporting a receptacle which contains a suitable arrangement of motor actuated mechanism.

With this and other objects in view, the invention consists in certain novel features of construction as hereafter shown and described and then specifically pointed out in the claims, and in the drawings illustrative of the preferred embodiment of the invention.

Figure 1 is a side elevation, partly in section. Fig. 2 is an end elevation, partly in section. Fig. 3 is a section on the line 3—3 of Fig. 2. Fig. 4 is a detailed plan view of the portion of the mechanism which is located upon the receptacle.

The improved device comprises a base support 10, of any suitable size, and which is designed to rest upon a floor or other support. Rising from the base 10 are two spaced side members 11—12 with the lower edges out-turned as shown at 13—14 to form supporting feet which bear upon the base 10. The portions 13—14 are secured by bolts or other suitable fastening devices 15—16 to the base 10, while the side members 11—12 are firmly secured together by transverse bolts 17 or other similar suitable fastening devices. By this means the base 10 and the frame members 11—12 are rigidly supported, and effectually prevented from movement relative to each other. The frame members 11—12 are utilized to support a suitable motor, and for the purpose of illustration a conventional spring motor is shown including a coiled spring 18, a crank shaft 19 and connecting gearing 20. The various shafts of the motor device and the crank shaft 19 are mounted for rotation in the members 11—12, as shown. Mounted to swing in the frame 11 is a stop pawl 21, the stop pawl having an arm 22 externally of the member 11 and provided with an offset 23 adapted to engage in one of the teeth of one of the gear wheels when the member 21 is disposed in one position, and thus lock the motor from movement. The stop pawl is thus operative from the exterior of the supporting frame. The shaft 24 of the spring 18 extends beyond the member 11 and is formed square to receive a crank so that the spring may be wound up when required.

The upper edges of the members 11—12 extend horizontally, and bearing upon these upper edges is a plate 25 having depending edges 26—27. Extending through the members 11—12 near one side is a relatively large pin 28, and the adjacent ends of the depending sides 26—27 of the plate 25 are provided with longitudinal slots, one of which is shown at 29, and adapted to bear over the projecting ends of the pin 28 when the plate 25—26—27 is disposed upon the side members 11—12. Formed through the side members 11—12 of the frame near the opposite sides are transverse apertures, and likewise formed through the depending portions 26—27 are corresponding apertures, the two sets of apertures being in transverse alinement and adapted to receive a holding pin 30. By this means the plate 25 with its depending sides 26—27 is detachably coupled to the members 11—12. Supported upon the plate 25 is a receptacle represented conventionally at 31, and this receptacle may be of any required form or size or of any required material, and utilized for containing any suitable product which requires manipulation or agitation from constantly moving members, as hereafter explained.

It is not desired to limit the mechanism which it is designed to employ in the receptacle in any manner, but for the purpose of illustration a conventional agitating mechanism is shown comprising a vertical shaft 32 and provided with a head member 33 and depending members 34, while the receptacle is provided with a plurality of ribs or slats 35 which coact with the members 34 to produce the requisite agitation.

The shaft 32 extends through the closure 36 of the receptacle and is provided upon its upper end with a gear wheel 37, the latter being arranged externally of the closure. Two L-shaped guide devices are provided, one of the guide devices being arranged with one arm 38 extending through the closure 36 of the receptacle with the other arm 39 bearing against the lower face of the receptacle, while the other guide device is arranged with one arm 40 extending through the closure and the other arm 41 bearing beneath the lower surface of the closure. The portions 39 and 41 of the guide device are secured by screws or other suitable fastening means to the closure 36, so that the upwardly directed portions 40—38 are rigidly supported in position. The portions 38—40 are provided with transverse apertures, and slidably disposed through the guide device is a bar 42, one portion of the bar 42 depending ownwardly as shown at 43. The main portion of the bar 42 extends through the upwardly directed member 40, while the depending portion 43 operates through the upwardly directed portion 38, the portion 40 being thus slightly longer than the portion 38, as shown in Fig. 3. Connected at 44—45 to the arm 42 is a rack bar 46, the rack bar arranged to engage with the gear 37 as shown in Fig. 4. By this means it will be obvious that when the bar 42 together with its connected rack bar 46 is vibrated through the guide members 38—40, the shaft 42 will be alternately oscillated, and a corresponding motion imparted to the members 33—34.

Connected to the receptacle 31 is a bracket 47, and pivoted at 48 within this bracket is a rocking lever 49. Pivoted at 50 to the lever 49 at its upper end is a connecting rod 51, the opposite end of the connecting rod being pivoted at 52 to the arm 42. Pivoted at 53 to the lever 49 at its lower end is a connecting rod 54, with the inner terminal of the rod 54 connected to the crank 55 of the shaft 19. By this arrangement it will be obvious that when motion is imparted by the motor, the lever 49 will be reciprocated, and this reciprocating motion imparted to the rack bar 46 and the oscillating motion transmitted to the members 33—34, as before described. By this simple means it will be obvious that an efficient and convenient supporting frame is produced which is utilized not only to support the motor, but likewise to support the receptacle, in detachable relations to the frame.

To detach the receptacle it is only necessary to withdraw the pins 53 and 30 and move the receptacle longitudinally of the members 11—12 until the slots 29 are free from the pin 28, and to attach the receptacle it is only necessary to operate the movements in reverse order, that is to say to locate the plate 25 upon the upper edges of the members 11—12 with the sides 26—27 in position and with the slots 29 engaging the pin 28, inserting the bar 30 through the alined apertures in the members 26—27 and 11—12 and again inserting the pin 53 to couple the members 49—54. If it is desired to detach the closure 36 together with the agitator members, it is only necessary to elevate the closure, the pivots 50 or 52 serving as a hinge to retain the closure member in position.

The improved device is simple in construction, can be inexpensively manufactured, and applied without material structural changes to mechanical devices of various kinds, and it is not desired therefore to limit the invention for use in connection with any specific mechanism which may require a reciprocating movement for its parts.

What is claimed is:—

1. The combination of a base, spaced frame members supported upon said base and having transverse apertures through the same at one end, a stationary pin extending through the side members at their other ends and projecting beyond the same, a plate having depending sides bearing upon opposite sides of the frame members, said depending sides having open slots at one end to engage over the projecting terminals of said pin and with transverse apertures registering with the apertures of the plate members, and a pin detachably engaging through said registering apertures, said plate adapted to support a receptacle.

2. The combination of a base, spaced frame members having out-turned lower edges secured upon said base and with transverse apertures through the side members at their upper edges, a pin extending through said side members, and projecting beyond the same, a plate having depending sides bearing upon opposite sides of the frame members, said depending sides having open slots at one end to engage over the projecting terminals of said pin and with transverse apertures registering with the apertures of the plate members, and a pin detachably engaging through said registering apertures, said plate adapted to support a receptacle.

In testimony whereof, I affix my signature, in presence of two witnesses.

JOHN C. NEUSCHWANDER.

Witnesses:
   HENRY B. WITTE,
   W. N. CRONKITE.